(12) United States Patent
Chang et al.

(10) Patent No.: US 9,123,958 B2
(45) Date of Patent: Sep. 1, 2015

(54) CATHODE ACTIVE MATERIAL FOR LITHIUM SECONDARY BATTERY

(71) Applicant: LG CHEM, LTD., Seoul (KR)

(72) Inventors: Sung-Kyun Chang, Daejeon (KR); Hyelim Jeon, Gunpo-si (KR); Hong Kyu Park, Daejeon (KR); Sang Uck Lee, Daejeon (KR); Cheol-Hee Park, Daejeon (KR)

(73) Assignee: LG CHEM, LTD., Seoul (KR)

( * ) Notice: Subject to any disclaimer, the term of this patent is extended or adjusted under 35 U.S.C. 154(b) by 179 days.

(21) Appl. No.: 13/654,536

(22) Filed: Oct. 18, 2012

(65) Prior Publication Data

US 2013/0040186 A1 Feb. 14, 2013

Related U.S. Application Data

(63) Continuation of application No. PCT/KR2011/003373, filed on May 6, 2011.

(30) Foreign Application Priority Data

May 8, 2010 (KR) .................. 10-2010-0043241

(51) Int. Cl.
| | |
|---|---|
| *H01M 4/58* | (2010.01) |
| *H01M 4/13* | (2010.01) |
| *H01M 4/60* | (2006.01) |
| *H01M 4/02* | (2006.01) |
| *H01M 4/505* | (2010.01) |
| *H01M 4/525* | (2010.01) |
| *H01M 4/485* | (2010.01) |
| *H01M 10/052* | (2010.01) |
| *B60L 11/18* | (2006.01) |
| *H01M 4/36* | (2006.01) |
| *H01M 4/131* | (2010.01) |

(52) U.S. Cl.
CPC .......... *H01M 4/505* (2013.01); *B60L 11/1868* (2013.01); *B60L 11/1879* (2013.01); *H01M 4/131* (2013.01); *H01M 4/364* (2013.01); *H01M 4/485* (2013.01); *H01M 4/525* (2013.01); *H01M 4/5825* (2013.01); *H01M 10/052* (2013.01); *Y02E 60/122* (2013.01); *Y02T 10/7005* (2013.01); *Y02T 10/7011* (2013.01); *Y02T 10/7066* (2013.01)

(58) Field of Classification Search
CPC combination set(s) only.
See application file for complete search history.

(56) References Cited

U.S. PATENT DOCUMENTS

| | | |
|---|---|---|
| 2004/0111873 A1 | 6/2004 | Okawa et al. |
| 2005/0026040 A1* | 2/2005 | Thackeray et al. ........ 429/231.1 |
| 2006/0099508 A1 | 5/2006 | Thackeray et al. |
| 2009/0081529 A1 | 3/2009 | Thackeray et al. |

FOREIGN PATENT DOCUMENTS

| | | | |
|---|---|---|---|
| JP | 11-273674 | * 10/1999 | ............. H01M 4/58 |
| JP | 11-273674 A | 10/1999 | |

OTHER PUBLICATIONS

English translation of JP 11-273674 (1999).*

* cited by examiner

*Primary Examiner* — Yoshitoshi Takeuchi
(74) *Attorney, Agent, or Firm* — Birch, Stewart, Kolasch & Birch, LLP

(57) ABSTRACT

Disclosed is a cathode active material for secondary batteries, comprising at least one compound selected from the following Formula 1: $xLi_2MO_3 \cdot yLiM'O_2 \cdot zLi_3PO_4$ (1) wherein M is at least one element selected from 1 period or 2 period metals having an oxidation number of +4; M' is at least one element selected from 1 period or 2 period metals having a mean oxidation number of +3; and $0.1 \leq x \leq 0.9$, $0.1 \leq y \leq 0.9$, $0 < z \leq 0.2$ and $x+y+z=1$.

10 Claims, No Drawings

CATHODE ACTIVE MATERIAL FOR LITHIUM SECONDARY BATTERY

TECHNICAL FIELD

The present invention relates to a cathode active material for secondary batteries. More specifically, the present invention relates to a cathode active material for secondary batteries that exhibits a high capacity and superior rate characteristics based on a specific composition.

BACKGROUND ART

Technological development and increased demand for mobile equipment have led to a rapid increase in the demand for secondary batteries as energy sources. Among these secondary batteries, lithium secondary batteries having high energy density and voltage, long lifespan and low self-discharge are commercially available and widely used.

In addition, increased interest in environmental issues has brought about a great deal of research associated with electric vehicles (EVs) and hybrid electric vehicles (HEVs) as substitutes for vehicles using fossil fuels such as gasoline vehicles and diesel vehicles which are major causes of air pollution. These electric vehicles generally use nickel metal hydride (Ni—MH) secondary batteries as power sources of electric vehicles (EVs), hybrid electric vehicles (HEVs) and the like. However, a great deal of study associated with use of lithium secondary batteries with high energy density and discharge voltage is currently underway and some are commercially available.

In particular, lithium secondary batteries used for electric vehicles should have high energy density, exhibit great power within a short time and be used for 10 years or longer under harsh conditions in which charge and discharge based on high current are repeated within a short time, thus requiring considerably superior stability and long lifespan, as compared to conventional small lithium secondary batteries.

Conventional lithium secondary batteries generally utilize a lithium cobalt composite oxide having a layered structure for a cathode and a graphite-based material for an anode. However, such lithium cobalt composite oxide is disadvantageously unsuitable for electric vehicles in terms of presence of extremely expensive cobalt as a main element and low safety. In order to solve these disadvantages, materials such as $Li(Ni_xMn_yCo_zO_2)$ (x+y+z=1) are used.

In order to secure structural stability of such a layer-structure cathode active material, many researchers have studied cathode active materials with a layered structure containing $Li_2MnO_3$. The cathode active materials with a layered structure containing $Li_2MnO_3$ is characterized in that Li is contained in a general transition metal layer made of $LiMO_2$ (M: transition metal) and they have super lattice peaks caused by the $Li_2MnO_3$ structure. Such a material advantageously contains a great amount of Mn and is thus considerably cheap and exhibits considerably high capacity at a high voltage. The material has a flat voltage region of 4.4 to 4.6V. After activation occurs in the flat region, capacity increases. This increase in capacity is known to be caused by deintercalation of Li from the transition metal layer due to generation of oxygen, but is still controversial.

Capacity increases after the activation region, but rate characteristics are clearly rapidly deteriorated. Due to these characteristics, this material is practically inapplicable to batteries at present.

In order to solve these problems in the related art, a method in which the active material is coated with particles after it is synthesized, has been attempted, but this method disadvantageously causes an increase in preparation cost. Furthermore, this method uses a post-treatment manner and does not contribute to variation and improvement in substantial internal structure, most structural variation is caused by formation process of crystalline at a high temperature of the synthesis process.

DISCLOSURE

Technical Problem

Therefore, the present invention has been made to solve the above and other technical problems that have yet to be resolved.

As a result of a variety of extensive and intensive studies and experiments to solve the problems as described above, the present inventor developed a cathode active material for secondary batteries having a mix composition of Formula 1 as a cathode active material for secondary batteries and discovered that, when a secondary battery is fabricated using this cathode active material, the secondary battery exhibits an increase in capacity after the activation region as well as superior rate characteristics. The present invention has been completed, based on this discovery.

Technical Solution

In accordance with one aspect of the present invention, provided is a cathode active material for secondary batteries, comprising at least one compound selected from the following Formula 1:

$$xLi_2MO_3 * yLiM'O_2 * zLi_3PO_4 \quad (1)$$

wherein M is at least one element selected from 1 period or 2 period metals having an oxidation number of +4, M' is at least one element selected from 1 period or 2 period metals having a mean oxidation number of +3, $0.1 \leq x \leq 0.9$, $0.1 \leq y \leq 0.9$, $0 < z \leq 0.2$ and x+y+z=1.

According to the cathode active material according to the present invention, it is understood that $Li_3PO_4$ is an ionic conductive substance which contributes to improvement of ionic conductivity between grains and induces a decrease of grain or crystal growth to reduce structural variation upon generation of oxygen in the activation process, increases surface area to improve rate characteristics and improves stability based on the stable structure of $PO_4$, but the principle thereof is not clearly known. For reference, the amount of Li in $Li_3PO_4$ may be varied within a significant level.

This cathode active material may be prepared by mixing a lithium precursor such as a transition metal precursor, with lithium hydroxide, lithium carbonate, and lithium phosphate, phosphate diammonum and the like, followed by baking in a furnace. In some cases, the cathode active material may be prepared in the form of a precursor by incorporating a $PO_4$ source into the precursor.

The active material of Formula 1 may be a composite or solid solution. In some cases, the active material may be present as a mixture thereof In Formula 1, when the content of $Li_3PO_4$ is excessively high, it inhibits activation of the active material and may make improvement in performance of the active material difficult. For this reason, as defined above, the content is preferably 0.2 or less based on the total amount (in moles), more preferably 0.1 or less, particularly preferably 0.001 to 0.1.

In Formula 1, M satisfies a metal that satisfies these conditions and is for example preferably at least one element selected from the group consisting of Mn, Sn, Ti and Zr, and M is more preferably Mn.

In addition, in Formula 1, M' is a transition metal that satisfies these conditions and is for example preferably composed of at least two elements selected from the group consisting of Mn, Ni and Co, and M' more preferably contains Mn and Ni.

In some cases, M and M' may each independently be substituted at a predetermined amount by a metal or non-metal element that may have a 6-coordinaion structure. The substitution amount of metal or non-metal element that may have a 6-coordinaion structure is preferably 10 mole % or less based on the total amount of the transition metal (M or M'). When the substitution amount is excessively high, disadvantageously, a desired level of capacity cannot be obtained.

In addition, in Formula 1, P may be substituted at a predetermined amount by an element stable for a 4-coordination structure. The element stable for a 4-coordination structure is preferably one or more elements selected from the group consisting of Si, V and Ti. The element is preferably substituted at 10 mole % or less based on the total amount of P.

Meanwhile, in Formula 1, the oxygen (O) ion may be substituted by another anion. The other anion is at least one element selected from the group consisting of halogen elements such as F, Cl, Br, I, sulfur, chalcogenide compounds, and nitrogen.

The substitution of anion advantageously improves a bonding force with transition metal and prevents structural transfer of the active material. When the substitution amount of anion is excessively high, stable structure of the compound is not maintained and lifespan characteristics may be deteriorated. Accordingly, the substitution amount of anion is preferably 20 mole % or less, more preferably 10 mole % or less based on the total amount of O.

The cathode active material according to the present invention has a small primary particle size under the same conditions, as compared to active materials containing no $Li_3PO_4$. It is understood that the rate characteristics of the cathode active material according to the present invention are improved due to this small particle size and ion conductive $Li_3PO_4$.

The present invention provides a cathode mix comprising the cathode active material. The cathode mix according to the present invention may comprise the cathode active material as well as a conductive material, a binder, a filler or the like, if necessary.

The conductive material is commonly added in an amount of 1 to 30% by weight, based on the total weight of the mixture comprising the cathode active material. Any conductive material may be used without particular limitation so long as it has suitable conductivity without causing adverse chemical changes in the battery. Examples of conductive materials include conductive materials, including graphite; carbon black such as carbon black, acetylene black, Ketjen black, channel black, furnace black, lamp black and thermal black; carbon derivatives such as carbon nanotube or fullerene; conductive fibers such as carbon fiber and metallic fibers; metallic powders such as carbon fluoride powders, aluminum powders and nickel powders; conductive whiskers such as zinc oxide and potassium titanate; conductive metal oxides such as titanium oxide; and polyphenylene derivatives.

The binder is a component which enhances binding of an electrode active material to a conductive material and current collector. The binder is commonly added in an amount of 1 to 30% by weight, based on the total weight of the mixture comprising the cathode active material. Examples of the binder include polyvinylidene, polyvinyl alcohol, carboxymethylcellulose (CMC), starch, hydroxypropylcellulose, regenerated cellulose, polyvinyl pyrrolidone, tetrafluoroethylene, polyethylene, polypropylene, ethylene propylene diene terpolymer (EPDM), sulfonated EPDM, styrene butadiene rubbers, fluororubbers and various copolymers.

The filler is a component optionally used to inhibit expansion of the electrode. Any filler may be used without particular limitation so long as it does not cause adverse chemical changes in the manufactured battery and is a fibrous material. Examples of the filler include olefin polymers such as polyethylene and polypropylene; and fibrous materials such as glass fibers and carbon fibers.

The present invention also provides a cathode for secondary batteries in which the cathode mix is applied to the current collector. The cathode may be for example fabricated by mixing the cathode mix with a solvent such as water or NMP to prepare a slurry, and applying the slurry to a cathode current collector, followed by drying and pressing.

The cathode current collector is generally fabricated to have a thickness of 3 to 500 µm. There is no particular limit as to the cathode current collector, so long as it has suitable conductivity without causing adverse chemical changes in the fabricated battery. Examples of the cathode current collector include stainless steel, aluminum, nickel, titanium, sintered carbon, and aluminum or stainless steel which has been surface-treated with carbon, nickel, titanium or silver. If necessary, these current collectors may also be processed to form fine irregularities on the surface thereof so as to enhance adhesion to the cathode active materials. In addition, the current collectors may be used in various forms including films, sheets, foils, nets, porous structures, foams and non-woven fabrics.

The present invention also provides a lithium secondary battery comprising the cathode, an anode, a separator, and a lithium salt-containing non-aqueous electrolyte.

For example, the anode is prepared by applying an anode mix comprising an anode active material to an anode current collector, followed by drying. The anode mix may comprise the afore-mentioned components, i.e., the conductive material, the binder and the filler, if necessary.

The anode current collector is generally fabricated to have a thickness of 3 to 500 µm. There is no particular limit as to the anode current collector, so long as it has suitable conductivity without causing adverse chemical changes in the fabricated battery. Examples of the anode current collector include copper, stainless steel, aluminum, nickel, titanium, sintered carbon, and copper or stainless steel which has been surface-treated with carbon, nickel, titanium or silver, and aluminum-cadmium alloys. Similar to the cathode current collector, if necessary, these current collectors may also be processed to form fine irregularities on the surface thereof so as to enhance adhesion to the anode active materials. In addition, the current collectors may be used in various forms including films, sheets, foils, nets, porous structures, foams and non-woven fabrics.

The separator is interposed between the cathode and anode. As the separator, an insulating thin film having high ion permeability and mechanical strength is used.

The separator typically has a pore diameter of 0.01 to 10 µm and a thickness of 5 to 300 µm. As the separator, sheets or non-woven fabrics made of an olefin polymer such as polypropylene and/or glass fibers or polyethylene, which have chemical resistance and hydrophobicity, are used. When a solid electrolyte such as a polymer is employed as the electrolyte, the solid electrolyte may also serve as both the separator and electrolyte.

The lithium salt-containing, non-aqueous electrolyte is composed of a non-aqueous electrolyte and a lithium salt. As the non-aqueous electrolyte, a non-aqueous electrolyte, solid electrolyte and inorganic solid electrolyte may be utilized.

Examples of the non-aqueous electrolyte that can be used in the present invention include non-protic organic solvents such as N-methyl-2-pyrollidinone, propylene carbonate, ethylene carbonate, butylene carbonate, dimethyl carbonate, diethyl carbonate, gamma-butyrolactone, 1,2-dimethoxy ethane, tetrahydroxy Franc, 2-methyl tetrahydrofuran, dimethylsulfoxide, 1,3-dioxolane, formamide, dimethylformamide, dioxolane, acetonitrile, nitromethane, methyl formate, methyl acetate, phosphoric acid triester, trimethoxy methane, dioxolane derivatives, sulfolane, methyl sulfolane, 1,3-dimethyl-2-imidazolidinone, propylene carbonate derivatives, tetrahydrofuran derivatives, ether, methyl propionate and ethyl propionate.

Examples of the organic solid electrolyte utilized in the present invention include polyethylene derivatives, polyethylene oxide derivatives, polypropylene oxide derivatives, phosphoric acid ester polymers, poly agitation lysine, polyester sulfide, polyvinyl alcohols, polyvinylidene fluoride, and polymers containing ionic dissociation groups.

Examples of the inorganic solid electrolyte include nitrides, halides and sulfates of lithium such as $Li_3N$, $LiI$, $Li_5NI_2$, $Li_3N$—$LiI$—$LiOH$, $LiSiO_4$, $LiSiO_4$—$LiI$—$LiOH$, $Li_2SiS_3$, $Li_4SiO_4$, $Li_4SiO_4$—$LiI$—$LiOH$ and $Li_3PO_4$—$Li_2S$—$SiS_2$.

The lithium salt is a material that is readily soluble in the above-mentioned non-aqueous electrolyte and examples thereof include $LiCl$, $LiBr$, $LiI$, $LiClO_4$, $LiBF_4$, $LiB_{10}Cl_{10}$, $LiPF_6$, $LiCF_3SO_3$, $LiCF_3CO_2$, $LiAsF_6$, $LiSbF_6$, $LiAlCl_4$, $CH_3SO_3Li$, $CF_3SO_3Li$, $(CF_3SO_2)_2NLi$, chloroborane lithium, lower aliphatic carboxylic acid lithium, lithium tetraphenyl borate and imides.

Additionally, in order to improve charge/discharge characteristics and flame retardancy, for example, pyridine, triethylphosphite, triethanolamine, cyclic ether, ethylenediamine, n-glyme, hexaphosphoric triamide, nitrobenzene derivatives, sulfur, quinone imine dyes, N-substituted oxazolidinone, N,N-substituted imidazolidinone, ethylene glycol dialkyl ether, ammonium salts, pyrrole, 2-methoxy ethanol, aluminum trichloride or the like may be added to the non-aqueous electrolyte. If necessary, in order to impart incombustibility, the non-aqueous electrolyte may further contain halogen-containing solvents such as carbon tetrachloride and ethylene trifluoride. Further, in order to improve high-temperature storage characteristics, the non-aqueous electrolyte may further contain carbon dioxide gas or the like and may further contain fluoro-ethylene carbonate (FEC), propene sulfone (PRS), fluoro-propylene carbonate (FPC) and the like.

The secondary battery according to the present invention may be preferably used for a battery cell used as a power source of small devices and for a unit battery of medium and large battery modules including a plurality of battery cells used as a power source of medium and large devices.

Preferably, examples of medium and large devices include, but are not limited to, power tools powered by battery-driven motors; electric vehicles including electric vehicles (EVs), hybrid electric vehicles (HEVs) and plug-in hybrid electric vehicles (PHEVs); electric two-wheeled vehicles including electric bikes (E-bikes), electric scooters (E-scooter); electric golf carts and the like.

BEST MODE

Now, the present invention will be described in more detail with reference to the following examples. These examples are provided only to illustrate the present invention and should not be construed as limiting the scope and spirit of the present invention.

EXAMPLE 1

Example 1

A transition metal composite precursor was synthesized by a coprecipitation method such that a ratio of transition metals was adjusted to $Ni_{0.25}Mn_{0.75}$, primarily mixed with $Li_2CO_3$ as a lithium precursor, and then secondarily mixed with $Li_3PO_4$ such that a molar ratio of the primary mixture and $Li_3PO_4$ was 0.97:0.03. The secondary mixture was incorporated into an electric furnace, was slowly heated from room temperature, maintained at 960° C. for 10 hours, and cooled in an ice bath to synthesize $0.485Li_2MnO_3*0.485LiNi_{0.5}Mn_{0.5}O_2*0.03Li_3PO_4$ as a cathode active material.

Comparative Example 1

$0.5Li_2MnO_3*0.5LiNi_{0.5}Mn_{0.5}O_2$ was synthesized as a cathode active material in the same manner as in Example 1 except that $Li_3PO_4$ was not mixed.

Example 2

A transition metal composite precursor was synthesized by a coprecipitation method such that a ratio of transition metals was adjusted to $Ni_{0.1875}Mn_{0.6375}Co_{0.125}$, primarily mixed with $Li_2CO_3$ as a lithium precursor, and then secondarily mixed with $Li_3PO_4$ such that a molar ratio of the primary mixture and $Li_3PO_4$ was 0.97:0.03. The secondary mixture was incorporated into an electric furnace, was slowly heated from room temperature and maintained at 960° C. for 10 hours, and cooled in an ice bath to synthesize $0.485Li_2MnO_3*0.485LiNi_{0.375}Mn_{0.375}Co_{0.25}O_2*0.03Li_3PO_4$ as a cathode active material.

Comparative Example 2

$0.5Li_2MnO_3*0.5LiNi_{0.375}Mn_{0.375}Co_{0.25}O_2$ was synthesized as a cathode active material in the same manner as in Example 2 except that $Li_3PO_4$ was not mixed.

Experimental Example 1

A cathode mix in which a ratio of cathode active material : conductive material:binder was 90:6:4 was prepared using each of the cathode active materials prepared in Examples 1 to 2 and Comparative Examples 1 to 2. The cathode was pressed using the cathode mix to obtain two coin-type batteries. An anode active material used herein was a Li-metal and an electrolyte used herein was an electrolytic solution in which 1M $LiPF_6$ was dissolved in a carbonate electrolyte. The battery thus fabricated was discharged at 0.1 C up to 4.8V and discharged at 0.1 C up to 2.5V at the $1^{st}$ cycle, and charged at 0.2 C to 4.5V and discharged at 0.2 C to 2.5V at the $2^{nd}$ cycle. Then, to measure rate characteristics, the battery was discharged at 0.1 C, 0.2 C, 0.5 C, 1.0 C, 1.5 C and 2.0 C up to 2.5V as the $3^{rd}$ to $8^{th}$ cycles based on charge at 0.5 C up to 4.5V. The initial discharge capacity, initial charge/discharge efficiency and rate characteristics were measured. The results are shown in Table 1 below.

TABLE 1

| | 1st cycle discharge capacity (mAh/g) | 1st charge/discharge efficiency (%) | 8th cycle/3rd cycle discharge capacity ratio (%) |
|---|---|---|---|
| Ex. 1 | 259 | 82 | 72 |
| Comp. Ex. 1 | 262 | 78 | 56 |
| Ex. 2 | 241 | 83 | 80 |
| Comp. Ex. 2 | 245 | 81 | 63 |

As can be seen from Table 1 above, the battery using the cathode active material having a mixed composition of the present invention exhibited a slight decrease in initial capacity, as compared to a battery containing no lithium phosphate, which is a considerably slight level that does not have an effect on electrochemical performance. Batteries using cathode active materials of Examples exhibited increases in charge and discharge efficiencies and, in particular, improvement in rate characteristics during high-rate discharge (in particular, 2.0 C discharge at the 8th cycle). Batteries used as a power source of vehicles and the like should be charged and discharged while exhibiting rate characteristics due to inherent characteristics thereof. In addition, small batteries also exhibit different behaviors according to the thickness of constituent electrodes and superior rate characteristics are considerably important requirements.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

INDUSTRIAL APPLICABILITY

As apparent from the afore-going, a non-aqueous electrolyte secondary battery based on a cathode comprising a cathode active material having a specific mix composition provides a secondary battery that exhibits a high capacity and superior rate characteristics.

The invention claimed is:

1. A cathode active material for secondary batteries, comprising at least one compound selected from the following Formula 1:

$$x\text{Li}_2\text{M}_{1-a}\text{A}_a\text{O}_{3-b}\text{B}_b * y\text{LiM}'_{1-a'}\text{A}'_{a'}\text{O}_{2-b'}\text{B}'_{b'} * z\text{Li}_3\text{P}_{1-a''}\text{A}''_{a''}\text{O}_{4-b''}\text{B}''_{b''} \quad (1)$$

wherein M is at least one element selected from 1 period or 2 period metals having an oxidation number of +4;

M' is at least one element selected from 1 period or 2 period metals having a mean oxidation number of +3;

A and A' are a metal or non-metal element that may have a 6-coordinaion structure, respectively;

A" is an element stable for a 4-coordination structure;

B, B', and B" are another anion, respectively; and $0.1 \leq x \leq 0.9$, $0.1 \leq y \leq 0.9$, $0 < z \leq 0.2$, $x+y+z=1$, $0 \leq a \leq 0.1$, $0 \leq a' \leq 0.1$, $0 \leq a'' \leq 0.1$, $0 \leq b \leq 0.1$, $0 \leq b' \leq 0.1$, $0 \leq b'' \leq 0.1$, wherein the at least one compound selected from Formula 1 is prepared by applying heat treatment to precursor materials for their conversion into the at least one compound, and the active material of Formula 1 is in the form of a composite or a solid solution.

2. The cathode active material according to claim 1, wherein, in Formula 1, z satisfies $0 < z < 0.1$.

3. The cathode active material according to claim 1, wherein M is at least one element selected from the group consisting of Mn, Sn, Ti and Zr.

4. The cathode active material according to claim 3, wherein M is Mn.

5. The cathode active material according to claim 1, wherein M' is at least two elements selected from the group consisting of Mn, Ni and Co.

6. The cathode active material according to claim 5, wherein M' comprises Mn and Ni.

7. A cathode mix for secondary batteries comprising the cathode active material according to claim 1.

8. A cathode for lithium secondary batteries in which the cathode mix according to claim 7 is applied to a current collector.

9. A lithium secondary battery comprising the cathode according to claim 8.

10. A medium and large battery pack comprising the lithium secondary battery according to claim 9 as a unit battery.

* * * * *